(12) United States Patent
Antony

(10) Patent No.: US 7,506,732 B2
(45) Date of Patent: Mar. 24, 2009

(54) APPLICATION DEVICE FOR A DISK BRAKE

(75) Inventor: Paul Antony, Worms (DE)

(73) Assignee: WABCO Perrot Bremsen GmbH, Mannheim (DE)

( * ) Notice: Subject to any disclaimer, the term of this patent is extended or adjusted under 35 U.S.C. 154(b) by 548 days.

(21) Appl. No.: 10/418,195

(22) Filed: Apr. 17, 2003

(65) Prior Publication Data

US 2003/0217898 A1 Nov. 27, 2003

(30) Foreign Application Priority Data

Apr. 29, 2002 (DE) .................... 102 19 148

(51) Int. Cl.
*F16D 55/08* (2006.01)
(52) U.S. Cl. .................... 188/72.7; 188/72.9
(58) Field of Classification Search ........... 188/71.1, 188/72.9, 72.7, 73.47, 72.6
See application file for complete search history.

(56) References Cited

U.S. PATENT DOCUMENTS

| | | | | | |
|---|---|---|---|---|---|
| 3,406,793 | A | * | 10/1968 | Buyze | 188/72.2 |
| 3,954,158 | A | * | 5/1976 | Rist | 188/72.7 |
| 4,089,393 | A | * | 5/1978 | Falk | 188/72.6 |
| 4,109,765 | A | * | 8/1978 | Johannesen | 188/72.7 |
| 4,861,194 | A | * | 8/1989 | Lang | 405/129.55 |
| 5,400,875 | A | * | 3/1995 | Anthony et al. | 188/72.9 |
| 5,433,298 | A | * | 7/1995 | Antony et al. | 188/72.7 |
| 5,547,048 | A | * | 8/1996 | Anthony | 188/72.9 |
| 5,622,240 | A | * | 4/1997 | Hartl | 188/72.6 |
| 5,927,445 | A | * | 7/1999 | Bieker et al. | 188/72.9 |
| 6,311,809 | B1 | * | 11/2001 | Thomas et al. | 188/72.9 |
| 6,332,514 | B1 | * | 12/2001 | Chen | 188/72.7 |

FOREIGN PATENT DOCUMENTS

| | | |
|---|---|---|
| DE | 2922472 | 12/1979 |
| DE | 7915980 | 2/1981 |
| DE | 2614321 | 1/1987 |
| DE | 4212365 A1 * | 10/1993 |
| DE | 4212384 A1 * | 10/1993 |
| DE | 8718084 | 2/1994 |
| DE | 9218246 | 2/1994 |
| DE | 4430258 | 1/1996 |
| EP | 0589206 | 2/1996 |
| EP | 0614024 | 9/1996 |
| GB | 2113326 A * | 8/1983 |

* cited by examiner

*Primary Examiner*—Thomas J Williams
(74) *Attorney, Agent, or Firm*—Friedrich Kueffner

(57) ABSTRACT

An application device for a disk brake includes an application shaft extending transversely of an application axis, a first support for supporting the application shaft on an application element, which is shiftable in the direction of the application axis, and a second support for supporting the application shaft on an abutment. The first and second supports have arc-shaped support surfaces on the application shaft, wherein the directions of the curvature of the support surfaces are the same, but the imaginary centers thereof do not coincide. The first and/or the second support has a support element which can shift transversely of the application axis. The support element is a sliding element, which is supported with a second flat slide face on a first flat slide face provided on the abutment or on the application element.

5 Claims, 6 Drawing Sheets

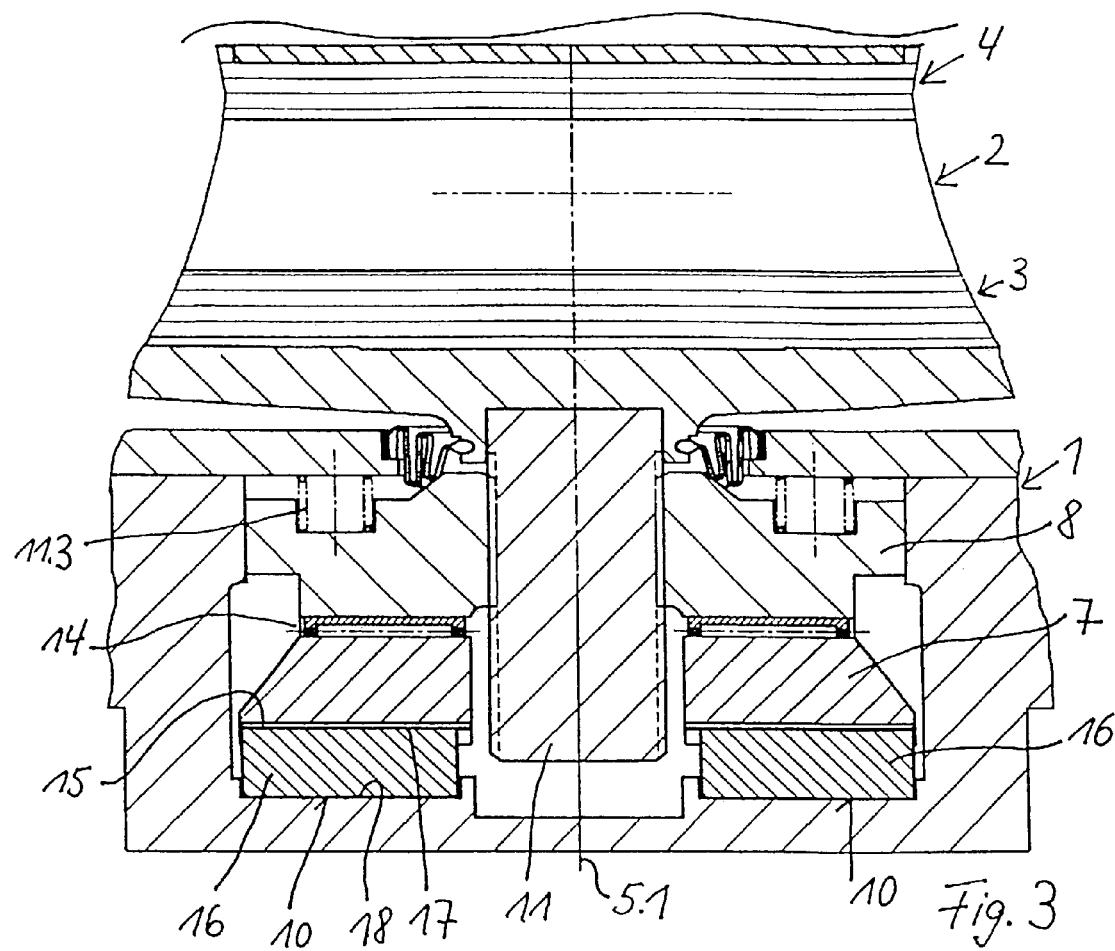
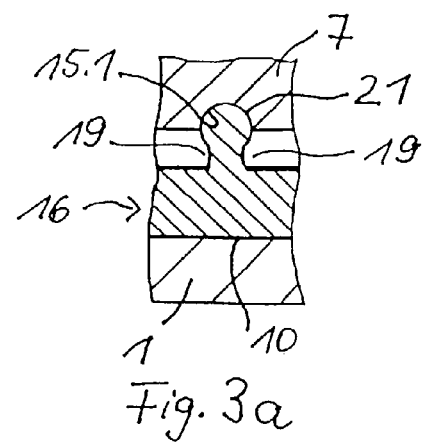
Fig. 3
Fig. 3a

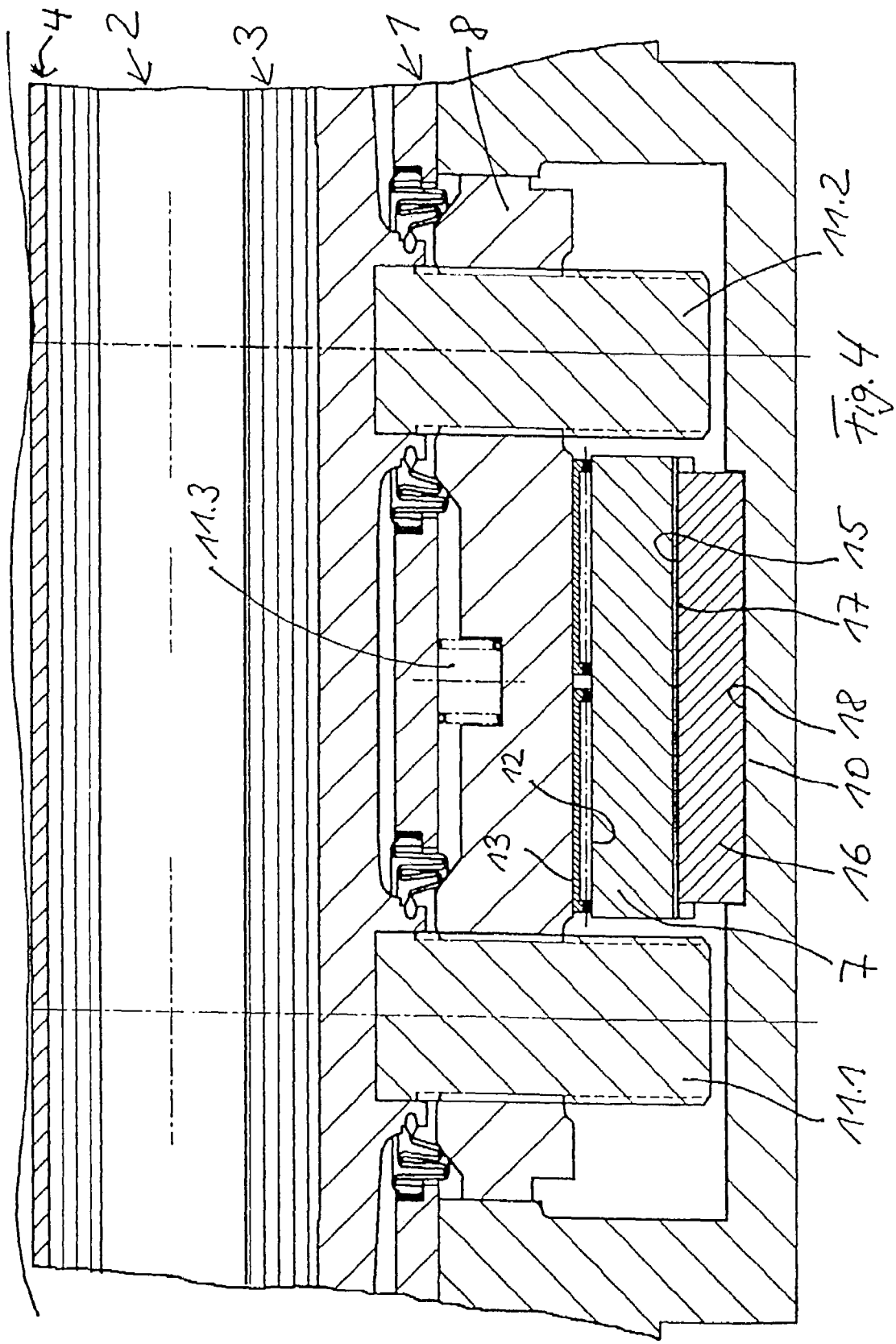

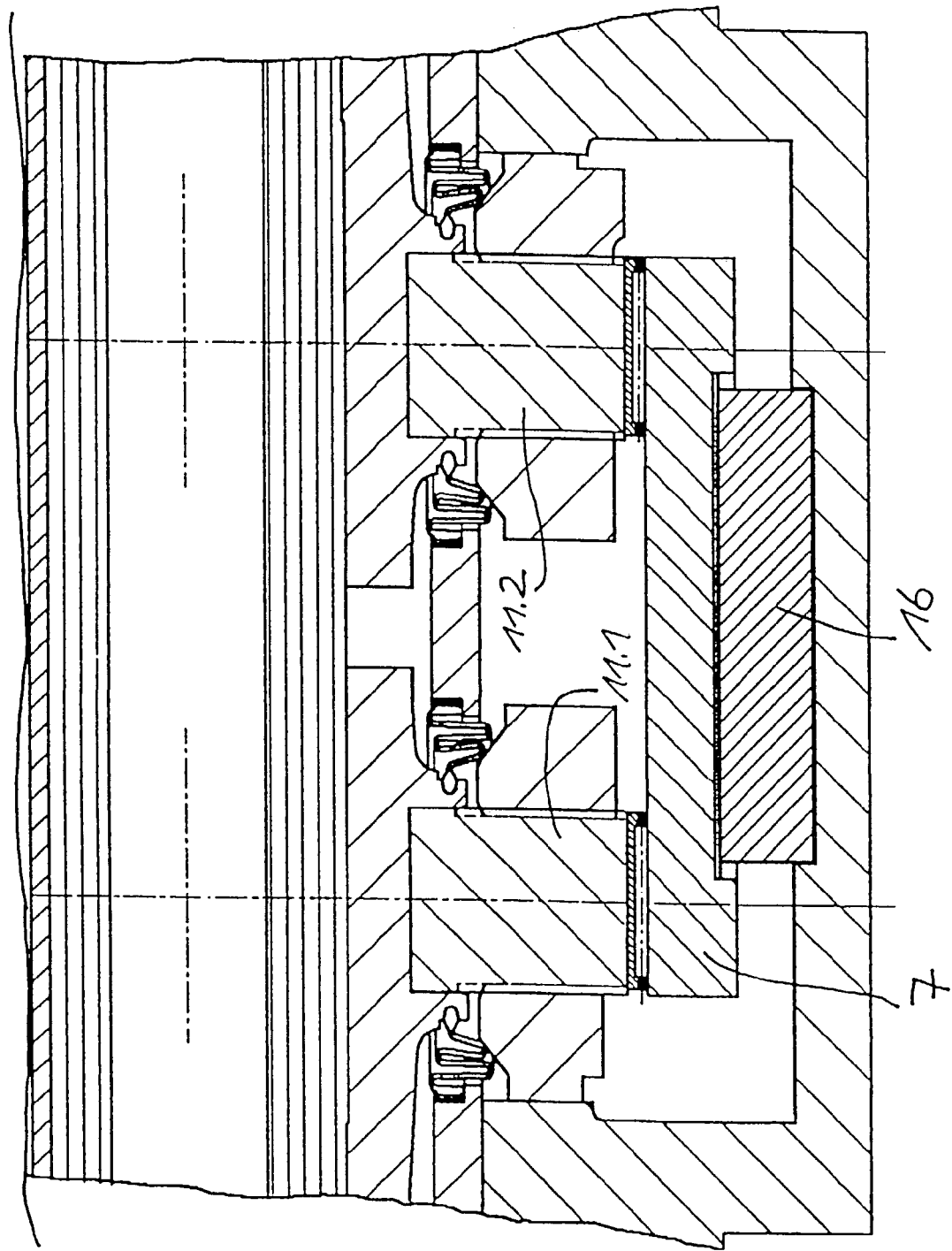

APPLICATION DEVICE FOR A DISK BRAKE

BACKGROUND OF THE INVENTION

1. Field of the Invention

The present invention relates to an application device for a disk brake with:
- an application shaft transverse to the application axis;
- a first support for supporting the application shaft on an application element, which can move in the direction of the application axis; and
- a second support for supporting the application shaft on an abutment,
- wherein the first and the second supports have arc-shaped support surfaces on the application shaft, these surfaces curving in the same direction but having imaginary centers which do not coincide; and
- wherein the first and/or the second support has a support element which can shift transversely to the application axis.

2. Description of the Related Art

Brake application devices of the type described above are known from, for example, DE 44 30 258 C1. This application device is a so-called linear applicator, which is designed so that the application element is displaced in linear fashion as soon as the application shaft starts to move. According to DE 44 30 58 C1, this element is a thrust element, which presses the brake lining against the brake disk of the disk brake. Linear application of this type offers considerable advantages over the pendulum type of application.

Additional linear application devices are known from DE 26 14 321 C2, EP 614 024 B1, and EP 589 206 B1.

The application device according to DE 44 30 258 also includes the above-mentioned thrust element, which is inside the caliper, parallel to the plane of the disk brake, and which has at least one extendable thrust spindle. Inside the caliper, the thrust element is supported and guided on at least one slide face parallel to the brake axis in such a way that it can carry the application shaft by way of an appropriate bearing; this bearing defines the center of rotation of the application shaft. On the side facing away from the brake disk, furthermore, the application shaft is supported by a freely rotating roller on the end of the caliper. The application device is tensioned against the rear surface of the caliper by at least one compression spring, as a result of which all the parts rest against each other. The application shaft is thus carried by the thrust element.

So that the displacement will be linear, all of the application devices cited above have either a special brake support system or a brake shaft with a special contour, which functions as a cam. Common to all of them is that a support element is supported by linear contact. Depending on how the brake shaft is supported, this linear contact can be either on the rear surface of the caliper (when the pivot bearing is on the application element) or on the application element (when the pivot bearing is on the caliper).

When the actuation unit provided for these application devices turns the application shaft (by means of an appropriate turning lever), the application shaft causes an increase in the amount of travel, and the thrust element is thus pressed by a pressure spindle, at least one of which is provided, against the brake lining. As a result of the special way in which the application shaft, which is equipped with actuating cams, is supported, and as a result of the special design of the cams and of the roller on the caliper, almost perfect linear movement toward the brake disk is ensured.

The principle described above has been found to be generally reliable for the practical operation of brakes, because it avoids the disadvantageous pendulum-like movements of the differently designed eccentric application devices, in which the application shafts, which carry the thrust elements, rotate around a stationary center in the caliper.

The linear application devices described above, however, are limited with respect to the amount of application forces they can transmit, because it is necessary to avoid overloads in the linear contact area. A conceivable solution would be to increase the diameter or the length of the roller body, so that the load in the linear contact area between the roller body and the rolling surface on the end of the caliper will not exceed a certain allowable limit; as a result, however, more space would be required to house the brake, which would lead to considerable disadvantages. In addition, the linear application devices described above impose high technical requirements on the materials which are used for the contact surfaces. That is, various hardening and grinding processes are always required. In addition, the materials which must be used are very expensive.

SUMMARY OF THE INVENTION

It is the object of the present invention to improve the brake application device of the type described above so that, at only modest production (fabrication) cost, higher application forces can be transmitted in a minimum of space. At the same time, the reliability of the mechanism is also to be increased to deal with the steadily increasing requirements on brake application devices.

The object defined above is met according to the invention in that the support element is a sliding element, which is supported by a second, flat slide face on a first slide face on the abutment or on the application element.

In other words, the roller body is replaced by a sliding type of support. The resulting elimination of linear contact and its replacement by two-dimensional contact have the effect of decreasing the amount of pressure applied per unit area, as a result of which higher application forces can be transmitted. All the advantages of linear brake application are thus preserved, while at the same time it is possible to impose less stringent requirements on the materials used. In addition, there is no longer any need to subject the individual parts or the materials out of which they are made to expensive processes (especially hardening and the like). These expensive processes can be replaced by standard types of processing. Finally, the amount of space occupied by the device is minimized.

On the side facing the application shaft, the support element according to the invention preferably has a contour which is complementary to the first or to the second arc-shaped support surface.

Instead of a rocking element with its disadvantageous bending and tilting moments, a sliding disconnect part is provided to cooperate with the second slide face provided on the other side of the support element. The disadvantages known to be associated with the rocking type of compensating elements in spherical shell-type guides are also avoided.

According to another preferred embodiment of the invention, it is provided that the support element has at least one groove-shaped recess.

As a result, the compactness of the unit is increased even more. In addition, the application shaft can be designed with a sturdy cross section, and part of the edge around the arc-shaped support surface of the shaft can fit into the recess, which increases the compactness even more. Of course, two opposing recesses can also be provided.

It is preferable for the contour of the support element which cooperates with the associated support surface on the application shaft to be spherical, where the associated arc-shaped support surface is preferably designed essentially in the manner of a spherical socket, on the surface of which the contour rests in two dimensions.

In this design, the two parts mentioned are also secured against axial displacement with respect to each other.

According to the invention, the contour of the support element cooperating with the associated support surface on the application shaft can also be in the shape of a rib; this contour is also a preferred design.

This design also allows two-dimensional contact between the surfaces.

Especially when single-spindle application devices are used, the ratio of the height H of the support element to its width B is preferably, according to the invention:

$$H:V \geq 0.9.$$

Especially when dual-spindle application devices are used, the ratio of the height H of the support element to its width B is preferably, according to the invention:

$$H:B \geq 1.1.$$

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 3 is a cross sectional view through the disk brake according to FIG. 1, again perpendicular to the application axis, but also perpendicular to FIG. 1, for the case of a single-spindle brake;

FIG. 3a shows a different design of the sliding element;

FIG. 4 is a cross sectional view through the disk brake according to FIG. 1, again perpendicular to the application axis but also perpendicular to FIG. 1, for the case of a dual-spindle brake;

FIG. 6 shows the same views as those of FIGS. 3 and 4 but for a different embodiment.

DETAILED DESCRIPTION OF PREFERRED EMBODIMENTS

Figure 1:
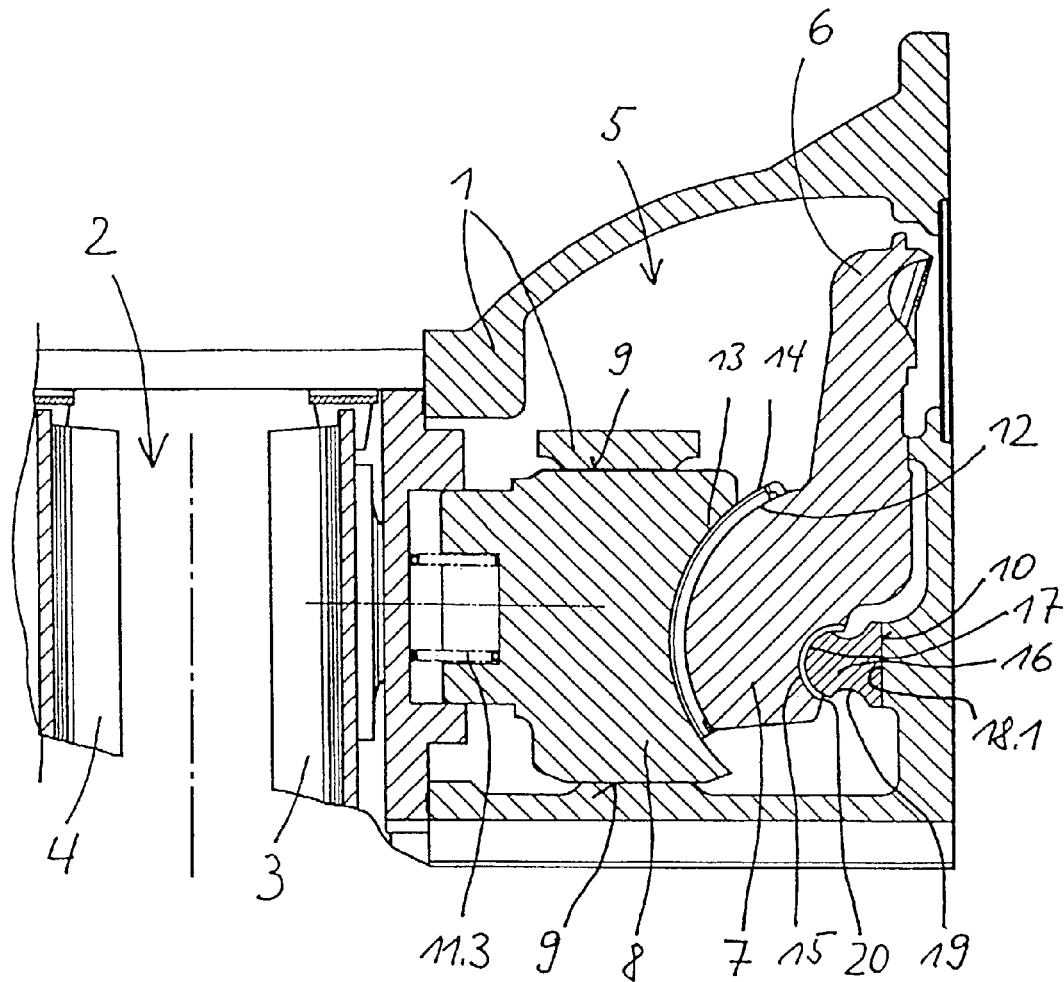
FIG. 1 is a cross sectional view perpendicular to the application axis of a disk brake with an application device in the stand-by position according to an exemplary embodiment of the invention.

Each of the Figures shows a disk brake with a caliper 1, the two sidepieces of which extend around a brake disk 2 in the conventional manner. Brake linings 3, 4 are provided on both sides. The application device is designated overall by the reference number 5 and is shown here on the right of the brake disk 2. The caliper 1 can be a sliding caliper or a floating caliper.

The application device 5 has a brake lever 6, which is connected to an application or brake shaft 7, this shaft being parallel to the main plane of the brake disk 2 in the caliper 1. In addition, a thrust piece 8 is provided (see FIG. 1, for example), which is also transverse to the plane of the brake disk and which is guided in the caliper. The brake lever 6 represents the connection between an actuating device (not shown), which introduces the force, and the application shaft 7. So that the thrust piece 8 can be shifted in a linear manner (in the axial direction) without oscillations, it is supported in the caliper by guides 9, which are parallel to the brake axis. Each of the guides 9 represents a part of the bearing by which the thrust piece 8 is supported in the caliper 1. The brake axis is parallel to the main axis of the brake disk 2 and is, for example, designated by the reference number 5.1 in FIG. 3.

A support surface 10, which is parallel to the plane of the brake disk, is provided at the end of the caliper 1. See, for example, FIG. 1. The length and design of this surface (divided/undivided) corresponds to the construction of the brake and to the design of the application shaft 7. Thus, for example, FIG. 3 shows a so-called single-spindle brake, in which only a single, adjustable thrust spindle 11 is mounted centrally in the thrust piece 8. FIG. 4, however, shows a dual-spindle brake with two thrust spindles 11.1, 11.2 in the thrust piece 8. The thrust spindles are part of a take-up device for adjusting the brake to compensate for the wear of the brake linings and brake disks.

The application device 5 is tensioned by at least one compression spring 11.3, which is mounted in the caliper 1 in such a way that all of the functional parts rest against each other and the brake lever 6 is in its rest position, so that no slipping can occur.

On the side facing away from the brake disk, the application shaft 7 has an approximately semi-cylindrical cam or shoulder 12. A corresponding internal cylindrical lateral surface 13 is provided on the thrust piece 8. As a result, the application shaft 7 is supported with freedom of rotation in the thrust piece 8. Because the bearing surfaces extend in the direction of the longitudinal axis of the application shaft 7, the pressure is transmitted uniformly. A pivot bearing 14 (plain bearing or roller bearing) is located between the shoulder 12 and the lateral surface 13.

An internal cylindrical contour 15 (see FIGS. 1 and 3) is formed in the application shaft with a center which is offset from the rotational axis of the application shaft 7, this contour being parallel to the shoulder 12. The offset in relation to the length of the brake lever 6 determines the leverage of the brake.

A sliding element 16 is provided between the internal cylindrical contour 15 and the support surface 10 on the caliper 1. This element has a head 17 in the form of part of a circle, which rests against the contour 15, and a sliding stabilizer base 18 with a slide face 18.1, which rests on the support surface 10. In the designs according to FIGS. 3, 4, and 6, the part-circle head 17 has the shape of a rib; that is, it extends down the entire length of the associated sliding element 16.

As already explained in the introduction to the specification, this sliding bearing in combination with the pivot bearing 17-15 has the effect of decreasing the amount of pressure per unit area being applied between the surfaces, and for this reason there is no need for special methods to process the materials, such as are required when only linear contact is present.

Figure 2:
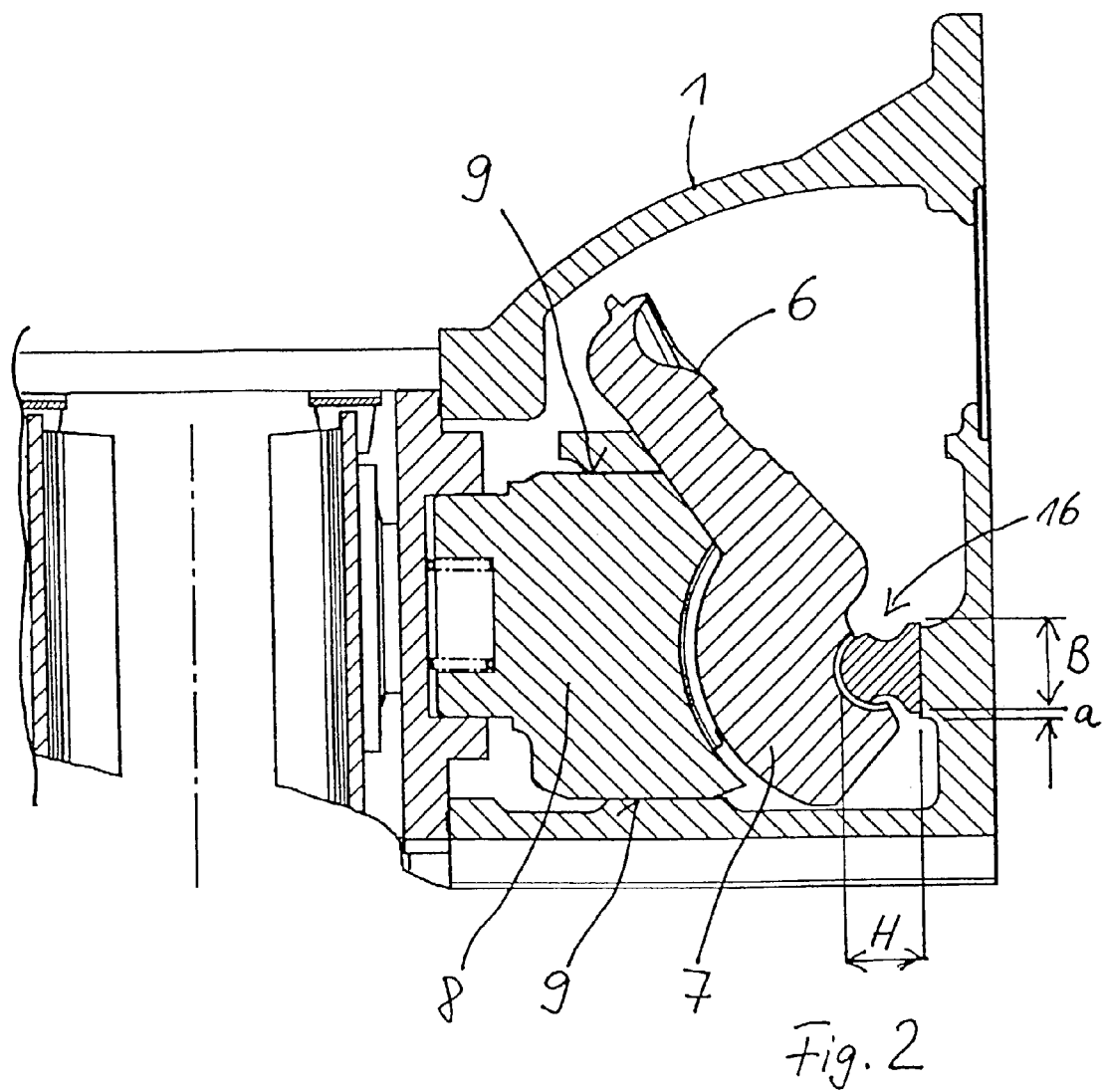
FIG. 2 is a cross sectional view perpendicular to the application axis of a disk brake with an application device in the actuating position according to an embodiment of the invention.

A groove-shaped recess 19 is provided between the part-circle head 17 and the sliding base 18 of the sliding element 16; this recess gives the edges of the arc-shaped contact surface with contour 15 room to move when the device returns to the rest position according to FIG. 1 or moves into in the actuating position according to FIG. 2. In the design according to FIGS. 3, 4, and 6, in which the head area 17 of the sliding element 16 extends down the entire length of the sliding element 16, which therefore has the shape of a rib, two constricted areas or groove-like recesses 19 are provided to accept parts of the application shaft in its various operating positions.

To reduce friction, a bearing shell 20 is also provided between the contour 15 and the head area 17 of the sliding element 16.

As can be derived from a comparison between FIGS. 3 and 4, the sliding element 16 can be divided or undivided, depending on the design of the application shaft 7. In the case of single-spindle brakes, it has been found especially advantageous for the slide block to be designed with a ratio of the height H to the width B of:

$$H:B \geqq 0.9,$$

and, in the case of dual-spindle brakes, with a ratio of:

$$H:B \geqq 1.1.$$

The fact that the stabilizer area 18 is relatively wide in comparison to the height of the element helps to counteract the tipping and/or bending moments with respect to the sliding element 16. In cooperation with the support surface 10, furthermore, the wide stabilizer area 18 also decreases the pressures being applied per unit area, which means that greater application forces can be applied.

The embodiment of the invention shown in FIGS. 1 and 2 achieves the goal that, when the application shaft 7 turns from the rest position according to FIG. 1 into the braking or actuating position according to FIG. 2, all of the parts rotate against each other. When the thrust piece 8 undergoes linear displacement with guidance in the bearings 9, the two-dimensional stabilizer- or sliding base 18 of the sliding element 16 simultaneously changes its position on the support surface 10 by the value "a" (see FIG. 2). There is therefore a relative displacement in the corresponding plane, which results in a disconnection; the rotational axis therefore shifts, and it is possible to ensure linear application even though two-dimensional contact is occurring between the surfaces. When the brake is released, all the application parts are pushed back into their starting positions by the compression spring 11.3. The sliding base 18 of the sliding element 16 is also pushed back along the support surface 10 to its starting position.

Figure 5:
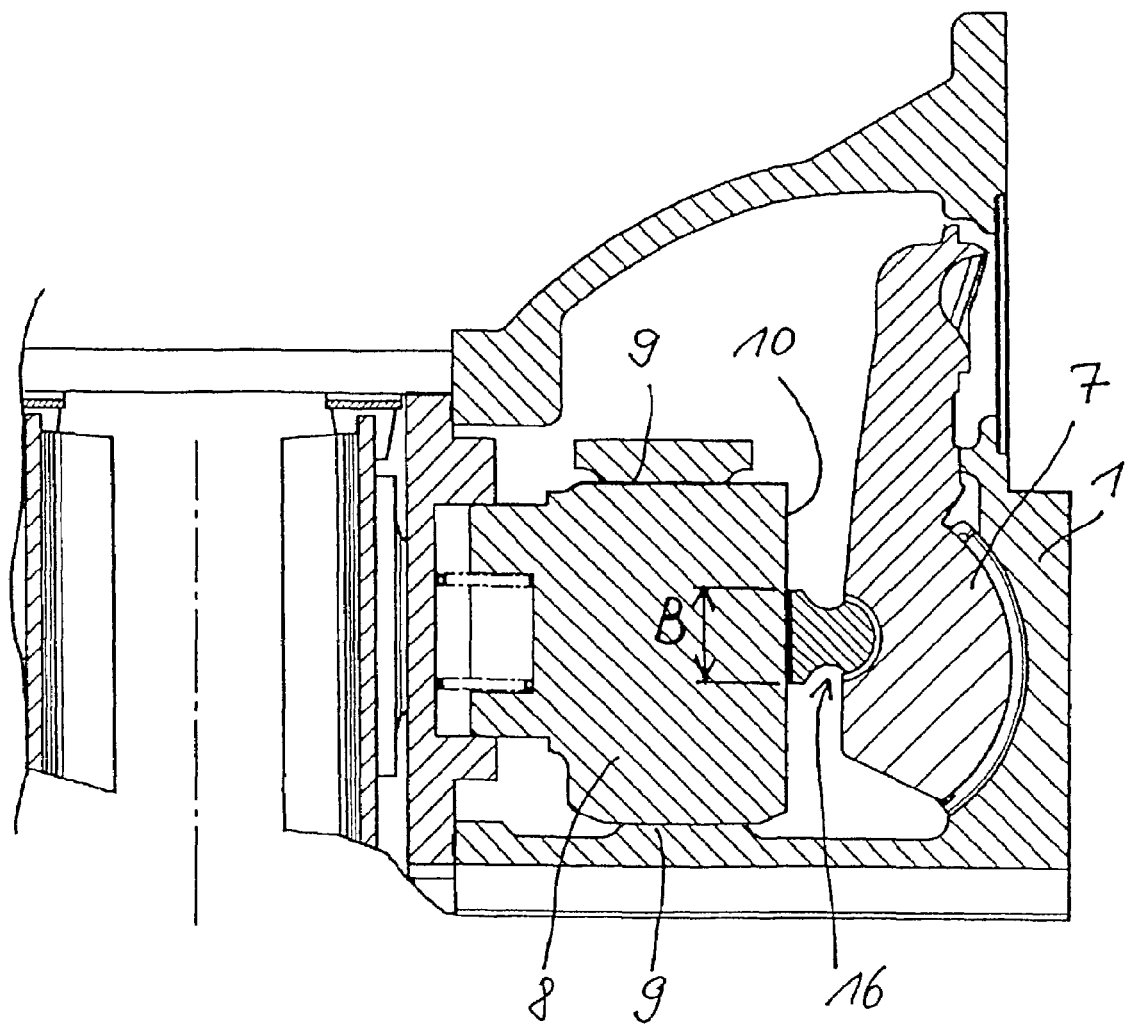
FIG. 5 shows the same view as FIG. 1, but in an embodiment representing a kinematic reversal of the embodiment according to FIG. 1.

FIG. 5 shows an exemplary embodiment of the invention in which the kinematics are reversed in comparison with the exemplary embodiment according to FIGS. 1 and 2. According to this design, the disconnection of the base area 18 of the sliding element 16 occurs in a plane formed by a support surface 10 on the thrust piece 8, this plane being parallel to the plane of the brake disk. Again the relative movement between the application shaft 7 and the thrust piece 8 allowed by this sliding connection has the effect of preventing the parts from jamming. Therefore, the same advantages are obtained as those present in the exemplary embodiment according to FIGS. 1 and 2, namely, low applied surface pressures, good sliding properties, and high application forces.

Figure 1A:
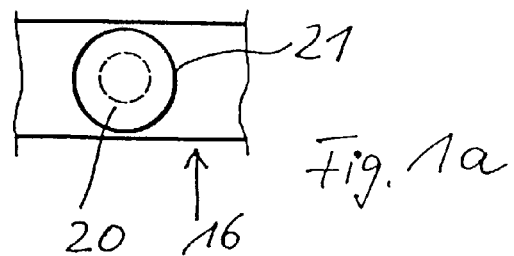
FIG. 1a shows a first embodiment of a sliding element.

FIGS. 1a and 3a show alternative designs of the head area of the sliding element 16. Thus a spherical head 21 is provided, which fits into a corresponding, socket-like spherical shell 15.1 in the application shaft 7. In this case, the recess 19 has the form of a ring-shaped groove.

The invention can be applied not only to the types of brakes described above, that is, not only to those in which at least one thrust spindle is supported in a thrust piece and the thrust piece serves to transmit the application forces. The invention can also be applied to brakes with a design according to FIG. 6, in which a thrust spindle device 11.1, 11.2, which is guided and supported axially in the caliper, is acted upon directly by the application shaft 7. In this design, cooperating brake shaft-sliding element bearings are also possible, as described above with reference to FIGS. 1-5.

It is especially preferable according to the invention for the sliding element 16 to be supported either on the application shaft 7 or on the support surface 10 in such a way that undesirable axial displacement is avoided. All the sliding and axes of rotation and the slide planes by which the disconnect function is obtained are preferably oriented with respect to each other in such a way that smooth-acting linear application is ensured and no twisting occurs upon actuation of the brake. As long as the idea of disconnection by way of slide faces is preserved, the mounting methods described above can be combined with each other in any desired way.

The features of the invention disclosed in the above specification, in the claims, and in the drawings can be essential both individually and in any combination to the realization of the invention in its various embodiments.

While specific embodiments of the invention have been shown and described in detail to illustrate the inventive principles, it will be understood that the invention may be embodied otherwise without departing from such principles.

I claim:

1. A linear application device for a disk brake, the application device comprising:
    an elongated application shaft extending transversely of an application axis;
    a brake lever integrally formed with the application shaft;
    a first support for supporting the application shaft on an application element, wherein the application element is shiftable in a direction of the application axis and non-rotatable;
    a second support for supporting the application shaft on an abutment, wherein the first and the second supports have arc-shaped support surfaces on the application shaft, the arc-shaped support surfaces each having a direction of curvature and an imaginary center point, wherein the directions of curvature of the arc-shaped support surfaces are the same, but the imaginary centers do not coincide;
    wherein at least one of the first and the second supports has a support element mounted so as to be shiftable transversely of the application axis;
    wherein the support element is comprised of a sliding element, wherein one of the abutment and the application element has a first flat slide face and the support element has a second flat slide face, and wherein the second flat slide face directly abuts in sliding contact the first flat slide face,
    wherein the support element has on a side facing the application shaft a contour which is complementary to a contour of one of the arc-shaped support surfaces, wherein the contour of the support element cooperating with the support surface on the application shaft is rib-shaped, and a compression spring arranged to tension all functional parts of the application device against one another so as to prevent slippage.

2. The application device according to claim 1, wherein the support element has at least one groove-shaped recess.

3. The application device according to claim 1, wherein the contour of the support element cooperating with the support surface on the application shaft is spherical.

4. A linear application device for a disk brake, the application device comprising:
- an elongated application shaft extending transversely of an application axis;
- a brake lever integrally formed with the application shaft;
- a first support for supporting the application shaft on an application element, wherein the application element is shiftable in a direction of the application axis and non-rotatable;
- a second support for supporting the application shaft on an abutment, wherein the first and the second supports have arc-shaped support surfaces on the application shaft, the arc-shaped support surfaces each having a direction of curvature and an imaginary center point, wherein the directions of curvature of the arc-shaped support surfaces are the same, but the imaginary centers do not coincide;
- wherein at least one of the first and the second supports has a support element mounted so as to be shiftable transversely of the application axis;
- wherein the support element is comprised of a sliding element, wherein one of the abutment and the application element has a first flat slide face and the support element has a second flat slide face, and wherein the second flat slide face directly abuts in sliding contact the first flat slide face,
- wherein the support element has on a side facing the application shaft a contour which is complementary to a contour of one of the arc-shaped support surfaces, and a compression spring arranged to tension all functional parts of the application device against one another so as to prevent slippage, wherein the support element has a height and a width, wherein the ratio of the height to the width is greater or equal to 0.9.

5. A linear application device for a disk brake, the application device comprising:
- an elongated application shaft extending transversely of an application axis;
- a brake lever integrally formed with the application shaft;
- a first support for supporting the application shaft on an application element, wherein the application element is shiftable in a direction of the application axis and non-rotatable;
- a second support for supporting the application shaft on an abutment, wherein the first and the second supports have arc shaped support surfaces on the application shaft, the arc-shaped support surfaces each having a direction of curvature and an imaginary center point, wherein the directions of curvature of the arc-shaped support surfaces are the same, but the imaginary centers do not coincide;
- wherein at least one of the first and the second supports has a support element mounted so as to be shiftable transversely of the application axis;
- wherein the support element is comprised of a sliding element, wherein one of the abutment and the application element has a first flat slide face and the support element has a second flat slide face, and wherein the second flat slide face directly abuts in sliding contact the first flat slide face,
- wherein the support element has on a side facing the application shaft a contour which is complementary to a contour of one of the arcshaped support surfaces, and a compression spring arranged to tension all functional parts of the application device against one another so as to prevent slippage, wherein the support element has a height and a width, wherein the ratio of the height to the width is greater than or equal to 1.1.

* * * * *